(No Model.)
A. W. SIMON.
COMBINED PHOTOGRAPHIC CAMERA SHUTTER AND DIAPHRAGM.
No. 369,997. Patented Sept. 13, 1887.
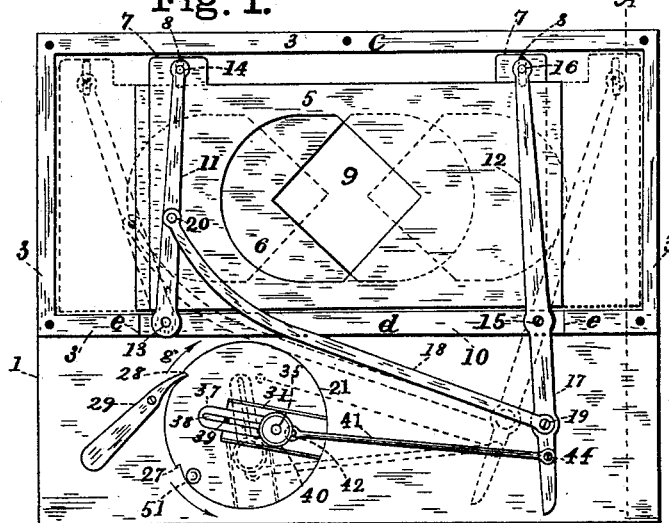
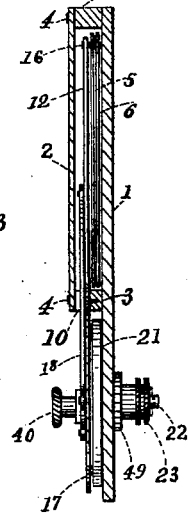
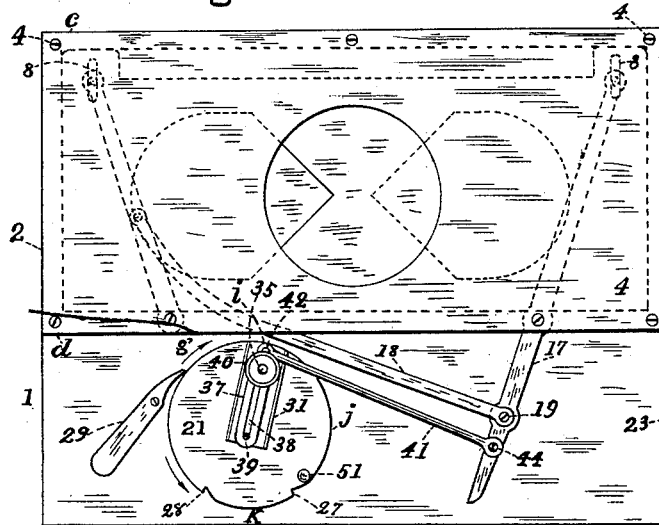
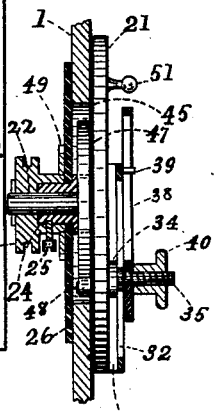
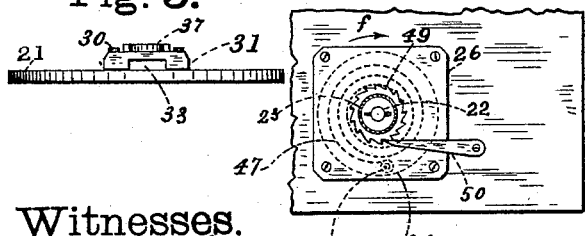
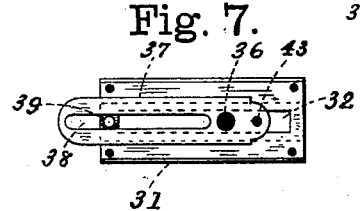
Witnesses.
Arthur Sangster
Henry Ashbery
Inventor.
Alfred W. Simon,
By James Sangster,
Atty.

UNITED STATES PATENT OFFICE.

ALFRED W. SIMON, OF AKRON, ASSIGNOR TO HIMSELF AND STEPHEN B. BUTTS, OF BUFFALO, NEW YORK.

COMBINED PHOTOGRAPHIC-CAMERA SHUTTER AND DIAPHRAGM.

SPECIFICATION forming part of Letters Patent No. 369,997, dated September 13, 1887.

Application filed May 26, 1887. Serial No. 239,404. (No model.)

*To all whom it may concern:*

Be it known that I, ALFRED W. SIMON, a citizen of the United States, residing in Akron, in the county of Erie and State of New York, have invented certain new and useful Improvements in Combined Photographic Shutter and Diaphragm, of which the following is a specification.

The object of my invention is to provide a photographic-camera shutter adapted for instantaneous work and as an adjustable diaphragm for giving any size of opening that may be required, and also providing the means for holding the shutters open to any desired size of opening for time-work. It is adapted to be attached to any of the ordinary cameras in any practicable position, but preferably between the lenses at the point where the rays of light cross each other, and to be connected to a camera in any way well known to photographers or the manufacturers of photographic instruments.

This invention does not consist in the location of the shutter between the lenses of the objective, or the two shutter-plates adapted to move in opposite directions, but in the means by which the movements of the shutters and the adjustment of the size of the openings are effected, all of which will be fully and clearly hereinafter described and claimed, reference being had to the accompanying drawings, in which—

Figure 1 is a front view with one side left off so as to expose the mechanism below it, showing the position of the shutters and their operating mechanism when held open, and, by dotted lines, the position of the parts when ready for a quick exposure, and also when shut after the exposure has been made. Fig. 2 is a section through line A B, Fig. 1. Fig. 3 is a front view of the device complete, showing the position of the parts when the shutters are closed. Fig. 4 is an enlarged sectional elevation showing an edge view of the crank-disk, the volute spring for actuating it, and a central section through the several parts connected therewith, also a longitudinal section through the center of the slotted plate rigidly attached to the crank-disk, the slotted crank, a side view of the bolt, and a section through the thumb-nut by which the crank is adjusted so as to give it a longer or shorter throw. Fig. 5 is an enlarged detached view of the crank-disk, an end view of the slotted plate rigidly secured to the crank-disk, and an end view of the slotted crank. Fig. 6 is a back view of a portion of the device, showing the mechanism for adjusting the spring, and also the spring by dotted lines; and Fig. 7 is an enlarged detached top view of the slotted crank and slotted plate below it.

The frame and supporting-plates 1 and 2 are preferably made of hard rubber, but may be made of any suitable material.

The plate 1 is provided with narrow frame-pieces 3, leaving a recess or depression deep enough to receive the shutters and a portion of their operating mechanism. The removable plate 2 is of the same length as the plate 1, but not so wide, extending only from the top $c$ down to $d$, so as to leave room for the mechanism below it. This plate 2 is secured in place by screws 4.

The movable shutters 5 and 6 are each provided with an upwardly-projecting piece, 7, each having a slot, 8. They are also each provided with an opening, 9, made preferably of a rectangular form on one side and curved at the opposite side, as shown; but any other suitable form may be used. These openings are so located as to pass each other when the two shutters 5 and 6 are moved longitudinally in opposite directions. The shutters are placed within the frame-pieces 3, which provide a space just large enough to receive them and allow sufficient room for their longitudinal movements. In the lower frame-piece 3 is a depression, 10, extending from $e$ to $e$. (See Fig. 1.) It is made deep enough to allow the arms 11 and 12 room enough to operate below the top plate, 2, and above the shutters 5 and 6. The arm 11 is pivoted in place by a pivot, 13, to the front portion, and to the shutter-plate 5 by a pin, 14, which passes through the slot 8 in the portion 7 of said plate or shutter, (see Fig. 1,) and the arm 12 is pivoted by a pin, 15, to the frame-piece and to the shutter-plate 6 by a pin, 16, which projects down into the slot 8 of its portion 7. Below the pin 15 is the lower part, 17, of the arm 12, and 18 represents a connecting-rod pivoted to the part 17 by a pin, 19, and to the arm 11 by a pin, 20.

By this construction it will be seen that a movement in either direction of the arm 12 will produce a movement in an opposite direction of the arm 11, and will consequently cause the shutter-plates 5 and 6 to slide by each other in opposite directions. The crank-disk 21 is also made, preferably, of hard rubber, and is provided with a shaft, 22. (See Fig. 4, where it is more clearly shown.) This shaft 22 is rigidly secured to the disk 21 and passes through a hole large enough to let it turn easily in the thumb-nut 23 and its part 24, which is rigidly secured to the part 23, by a set-screw 25. By this construction the part 23 rests on the covering-plate 26 (see Figs. 4 and 6) and the portion 24 passes through a hole in the covering-plate 26 just large enough to receive it, and then into the thumb-nut 23, (see Fig. 4,) where it is secured rigidly thereto by the set-screw 25. Now these parts 23 and 24 are fitted together so as to turn easily on the covering-plate 26 and still be held securely thereto in place, so that they hold the crank-disk 21 in position, while it has a free turning movement. This crank-disk 21 is provided with two notches, 27 and 28, into which the pawl 29 catches when required.

On the top of the crank-disk is secured by screws or bolts 30 (see Figs. 5 and 7) a plate, 31, having a slot, 32, running nearly its whole length, (see Figs. 4 and 7,) and on its under side is a long narrow recess or groove, 33, along its entire length. (Shown in Figs. 4, 5, and 7, Fig. 5 showing an end view of said groove.) The head 34 of the bolt 35 passes easily along in this groove back and forth, and, if desired, may be made square, so as to prevent it from turning in the groove; or that portion of the bolt which is in the slot 32 may be flat at the sides, so as to prevent it from turning. This bolt then passes up through a hole, 36, (shown in Fig. 7,) in the crank 37. 38 is a long narrow slot in said crank, and a pin, 39, passes through it and is rigidly secured to the plate 31, the object of which is to keep the crank in line. Above the crank on the bolt 35 is a thumb-nut, 40. It will now be seen that this crank 37 may be moved longitudinally back and forth and rigidly secured at any desired point by the thumb-nut 40, and in this way its length from the center of the crank-disk 21 may be made greater or less, and consequently the length of its throw adjusted. The outer end of the crank passes beyond the crank-pin sufficiently to receive the end of the connecting-rod 41, pivoted by a pin, 42, which pin passes through a hole, 43. (Shown in Fig. 7.) The opposite end of this connecting-rod 41 is pivoted by a pin, 44, to the arm 17 or lower part of the arm 12.

In the side plate, 1, opposite the crank-disk 21, is a circular opening, 45. (Shown in the sectional elevation, Fig. 4, and by dotted lines 46 in Fig. 6.) In this circular opening 45 is a volute spring, 47, having one end secured to the crank-disk by a pin, 48. (Shown in Fig. 4 and by dotted lines in Fig. 6.) The opposite end of this spring 47 is secured to the barrel or part 24 in any well-known way. To the thumb-nut 23 is securely fastened a ratchet-wheel, 49, and a pawl, 50, pivoted to the covering-plate 26 and adapted to engage with the teeth in the ratchet-wheel 49. The part 24 being rigidly secured by the set-screw 25 to the thumb-nut 23, the two turn together. It will be apparent from this construction that by turning the thumb-nut 23 in the direction of the arrow $f$ (see Fig. 6) this volute spring 47 will be wound up, and consequently its force increased, the pawl 50 holding it at any point required; and it will be seen that its force may be decreased by lifting the pawl 50 out of the teeth in the wheel 49 and allowing the spring to move the ratchet-wheel back, and allowing the pawl 50 to engage with the ratchet-wheel and hold it at the desired point.

The operation of the invention is as follows: When it is desired to open the shutters and hold them open for time-work or for any other purpose, the crank-disk is moved by taking hold of the small handle 51 and turning said disk in the direction of the arrow $g$ until the notch 28 engages with the pawl 29. This operation moves the crank-disk and the crank from the position shown in Fig. 3 to the position shown in Fig. 1. When it is desired to instantaneously bring the parts again into the position shown in Fig. 3, all that is necessary to do is to disengage the pawl 29, and the crank-disk, connecting-rod 41, pivoted arms 11 12 17, and the shutters 5 and 6 will immediately resume their normal position by the action of the volute spring. When it is desired to set the device for an instantaneous exposure, the crank-disk is moved in the direction of the arrow $g$ until the pawl 29 engages with the notch 27. This operation, it will be seen, causes the crank in moving from the point $i$ (see Fig. 3) to the point $j$ to open the shutters to their fullest extent, and as it continues its movement until the crank reaches the point $k$, or until the pawl 29 drops into notch 27, the shutters will be carried past each other until the openings are closed. All that is necessary to do now to cause them to instantly spring back to their normal position is to disengage the pawl 29. When it is necessary to change the size of the opening through the shutters or to use them as a diaphragm, all that is required is to loosen the thumb-nut and adjust the throw of the crank to the point desired, and then tighten the thumb-nut, as hereinbefore mentioned.

I am aware that it is not new to move two shutters simultaneously in opposite directions or to regulate the distance of the movement of said shutters so as to use them as a diaphragm, as this has been done before, as shown by the English patent of Sands, No. 2,783, A. D. 1881. I therefore do not claim such broadly; but What I do claim is—

1. The combination of two shutters having openings, substantially as specified, with two pivoted arms, one pivoted at its lower end and to the shutter-frame and its upper end to one of the shutters, the other pivoted on or about the same horizontal line to the shutter-frame and its upper end to the other shutter, a connecting-rod pivoted to one arm above its pivoted point on the shutter-frame and to the opposite arm at a point below its pivoted point on the shutter, a connecting-rod pivoted to the lower part of said arm and having its opposite end pivoted to a crank, a crank-disk provided with notches, a pivoted pawl for engaging with said notches, and a spring for operating the whole, substantially as and for the purposes described.

2. The combination of two apertured shutters, their operating-arms pivoted to the case, a connecting-rod for connecting the two arms as above specified, a crank-disk having a spring for operating it, and notches and a pawl for holding it against the force of the spring when engaged with either of said notches, a crank made adjustable to or from the center of said disk, so that its throw may be made greater or less, and a connecting-rod for connecting said crank with the lower part, 17, of the pivoted arm 12, whereby the size of the opening through the shutters may be adjusted, substantially as described.

3. The combination of a photographic-camera shutter, the crank-disk, a volute spring connected with the crank-disk at one end and the other end connected with a barrel, 24, having a thumb-nut, 23, the parts 23 and 24 being connected together and to the covering-plate by a set-screw, a ratchet-wheel connecting the thumb-nut, and a pivoted pawl for engaging with the teeth in said wheel, whereby the tension or force of the spring may be adjusted, substantially as described.

4. A photographic-camera shutter, a crank-disk having a slotted plate rigidly connected thereto and provided with a groove on its under side running its entire length, and a screw-bolt having a head adapted to slide in said groove, in combination with a slotted crank, a pin secured to the slotted plate and projecting through the crank-slot, the slotted crank having a hole through which the screw-bolt passes, and a thumb-nut for securing the whole at any point desired, whereby the length of the throw of the crank may be made greater or less, substantially as described.

ALFRED W. SIMON.

Witnesses:
JAMES SANGSTER,
STEPHEN B. BUTTS.